United States Patent
Hisano et al.

(10) Patent No.: US 9,294,018 B2
(45) Date of Patent: Mar. 22, 2016

(54) ELECTRIC MOTOR CONTROL DEVICE

(71) Applicant: Mitsubishi Electric Corporation, Tokyo (JP)

(72) Inventors: Yuya Hisano, Tokyo (JP); Ryo Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 26 days.

(21) Appl. No.: 14/299,810

(22) Filed: Jun. 9, 2014

(65) Prior Publication Data

US 2015/0097509 A1   Apr. 9, 2015

(30) Foreign Application Priority Data

Oct. 8, 2013   (JP) ................................. 2013-210696

(51) Int. Cl.
*H02P 6/00* (2006.01)
*H02P 29/00* (2006.01)
*H02P 6/10* (2006.01)

(52) U.S. Cl.
CPC *H02P 6/002* (2013.01); *H02P 6/10* (2013.01); *H02P 29/0044* (2013.01)

(58) Field of Classification Search
CPC ...................................................... H02P 6/002
USPC .................................................. 318/719, 717
See application file for complete search history.

(56) References Cited

U.S. PATENT DOCUMENTS

| | | | | |
|---|---|---|---|---|
| 7,151,355 B2* | 12/2006 | Izumi | ....................... | B60K 6/48 180/65.1 |
| 7,495,411 B2* | 2/2009 | Kaneko | ................. | B60L 11/123 180/65.1 |
| 7,859,209 B2* | 12/2010 | Iwaji | ........................ | H02P 6/10 318/400.14 |
| 2007/0120520 A1 | 5/2007 | Miyazaki et al. | | |
| 2010/0001672 A1 | 1/2010 | Maeda et al. | | |

FOREIGN PATENT DOCUMENTS

| | | |
|---|---|---|
| JP | 2009-268332 A | 11/2009 |
| JP | 2010-130870 A | 6/2010 |

(Continued)

OTHER PUBLICATIONS

Communication dated Oct. 21, 2014, issued by the Japanese Patent Office in counterpart Japanese application No. 2013-210696.

(Continued)

*Primary Examiner* — David S Luo
(74) *Attorney, Agent, or Firm* — Sughrue Mion, PLLC; Richard C. Turner

(57) ABSTRACT

An electric motor control device includes a torque command generation portion that outputs a torque command τc generated on the basis of a rotation speed R and specifying an output torque, a minimum energization point number generation portion that generates a minimum number of energization points, Nmin, indicating the minimum number of points to be energized in windings of an armature and a field on the basis of the rotation speed R and the torque command τc, an energization signal generation portion that outputs an energization signal S on the basis of a state quantity M of an electric motor, the minimum number of energization points, Nmin, the torque command τc, a DC voltage value Vdc, a current value I, and a field position θ, and an energization portion that energizes an armature winding and a field winding according to the energization signal S.

15 Claims, 2 Drawing Sheets

(56) References Cited

FOREIGN PATENT DOCUMENTS

| JP | 2010-233392 A | 10/2010 |
| JP | 2013017263 A | 1/2013 |

OTHER PUBLICATIONS

Communication dated Apr. 9, 2015, issued by the German Patent Office in corresponding German Application No. 10 2014 217 878.9.

* cited by examiner

_US 9,294,018 B2_

ELECTRIC MOTOR CONTROL DEVICE

BACKGROUND OF THE INVENTION

1. Field of the Invention

The present invention relates to an electric motor control device that controls an electric motor having an armature or both of an armature and a field.

2. Description of the Related Art

Generally, an AC electric motor has an armature formed of multiple windings in many cases and this configuration often allows rotation itself to continue in the event of an open phase due to a failure in part of the wirings. This configuration, however, has a problem that adverse effects, such as a desired torque cannot be obtained and a torque ripple is increased, occur frequently.

For the control on the electric motor to be continued in the event of a failure in part of the electric motor, a motor control device described, for example, in JP-A-2009-268332 is formed of a three-phase inverter circuit 10, a neutral voltage detection circuit 15, and a micro-computer 17. The neutral voltage detection circuit 15 is formed of a circuit that detects a neutral voltage across a three-phase AC motor M1. After one phase out of all phases becomes unable to carry a current, the micro-computer 17 determines a variance of a failure state on the basis of an output voltage of the neutral voltage detection circuit 15 and, when the failure state varies, controls the three-phase inverter circuit 10 under a control state corresponding to the varied failure state. Accordingly, even when one phase out of all phases becomes unable to carry a current and the failure state varies afterward, it becomes possible to perform the control corresponding to the failure state that has varied.

The motor control device described in JP-A-2009-268332 performs the control corresponding to the failure state. However, control such that forestalls a failure is not performed. More specifically, this motor control device does not perform control in consideration of temperatures and heat generation, which are chief factors of a failure in an electric motor and an electric motor control device, and therefore has a problem that a failure may possibly occur due to a temperature rise or an increase in heat generation during the control of the electric motor.

SUMMARY OF THE INVENTION

The invention was devised to solve the problems discussed above and has an object to provide an electric motor control device capable of continuing to perform control while forestalling a failure in an electric motor or the electric motor control device.

An electric motor control device according to an aspect of the invention includes: energization elements provided correspondingly to an armature winding and a field winding of an electric motor having an armature or both of an armature and a field; an energization portion that energizes the armature winding and the field winding according to an energization signal given to the energization elements; and an energization signal generation portion that generates the energization signal to be outputted to the energization portion. The energization signal is generated on the basis of at least one state quantity among state quantities of the armature, the field, and the energization elements and outputted.

According to the electric motor control device of the invention, by selecting an armature winding and a field winding to be energized according to the temperature or the heat value, it becomes possible to forestall a failure occurring when the temperature or the heat value exceeds an allowable value while allowing an operation itself of the electric motor to continue.

The foregoing and other objects, features, aspects, and advantages of the present invention will become more apparent from the following detailed description of the present invention when taken in conjunction with the accompanying drawings.

DETAILED DESCRIPTION OF THE INVENTION

Hereinafter, an electric motor control device according to an embodiment of the invention will be described with reference to FIG. 1 and FIG. 2.

First Embodiment

Figure 1:
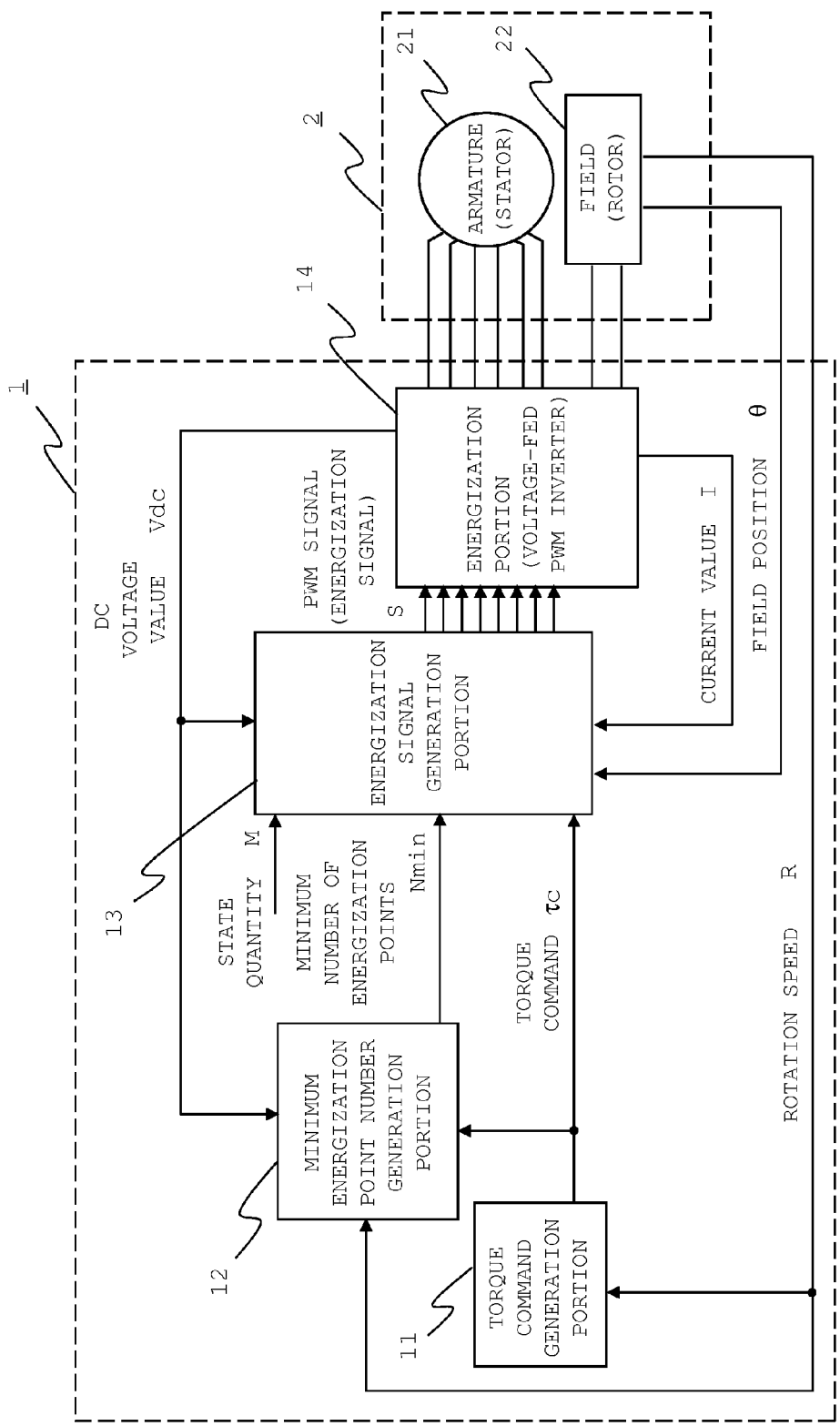
FIG. 1 is a view schematically showing a configuration of an electric motor control device according to a first embodiment and a controlled electric motor.
Figure 2:
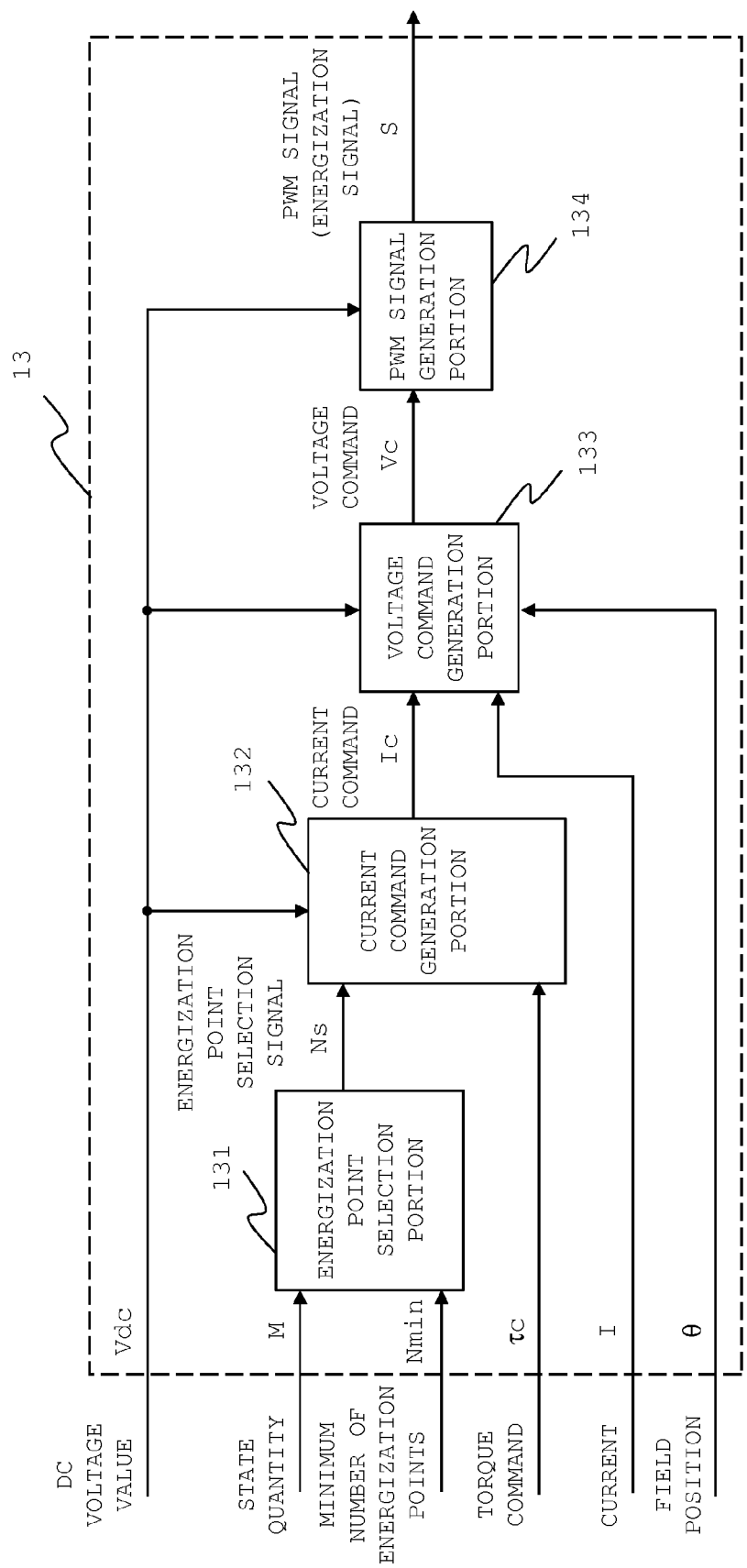
FIG. 2 is a view schematically showing a configuration of an energization signal generation portion in the electrical motor control device according to the first embodiment.

FIG. 1 is a view schematically showing a configuration of an electric motor control device according to a first embodiment and a controlled electric motor. FIG. 2 is a view schematically showing a configuration of an energization signal generation portion in the electric motor control device.

As is shown in FIG. 1, an electric motor 2 controlled by an electric motor control device 1 is a wound-field six-phase electric motor and has an armature (stator) 21 and a field (rotor) 22. A six-phase electric motor includes various types and the one used herein has two sets of delta-connected three-phase armature windings and two sets of field windings. The electric motor control device 1 is formed of a torque command generation portion 11 that outputs a torque command $\tau c$ generated on the basis of a rotation speed R and specifying an output torque of the electric motor 2, a minimum energization point number generation portion 12 that generates a minimum number of energization points, Nmin, indicating the minimum number of points N to be energized in the windings of the armature 21 and the field 22 of the electric motor 2 on the basis of the rotation speed R and the torque command $\tau c$, an energization signal generation portion 13 that generates an energization signal S on the basis of a state quantity M, the minimum number of energization points, Nmin, the torque command $\tau c$, a DC voltage value Vdc, a current value I, and a rotor position $\theta$, and an energization portion 14 that energizes the armature windings of the armature 21 and the field windings of the field 22 of the electric motor 2 according to the energization signal S. Herein, the energization portion 14 is a voltage-fed PWM inverter having as many energization elements as the respective windings of the armature 21 and the field 22.

An operation of the minimum energization point number generation portion 12 will now be described in detail. The minimum energization point number generation portion 12 generates the minimum number of energization points, Nmin, on the basis of the rotation speed R and the torque command $\tau c$. In the electric motor control device 1 of this embodiment, points to be energized in the armature windings of the armature 21 and the field windings of the field 22 of the electric motor 2 are selected by the energization signal generation portion 13. Generally, as the number of energization points, N, becomes smaller, a torque $\tau$ that can be outputted is reduced and a torque ripple is increased. Noises are increased or reduced depending on the magnitude of the torque τ and a degree of the torque ripple. Hence, when the energization points are selected, it is necessary to preliminarily determine the minimum number of energization points required to achieve a desired operation state.

The minimum number of energization points, Nmin, can be generated on the basis of the rotation speed R and the torque command τc by computation or with the use of a table. Herein, a table from which to output the minimum number of energization points, Nmin, is preliminary created using the rotation speed R, the torque command τc, and the DC voltage value Vdc as arguments. The reason why a reference is made to the DC voltage value Vdc is as follows. That is, this embodiment uses a voltage-fed PWM inverter as the energization portion 14. Hence, of the maximum output of the energization portion 14, a proportion of the armature windings of the armature 21 is $1/\sqrt{2}$ times the DC voltage value Vdc in terms of a fundamental effective value of a voltage applied to one coil in the delta-configuration connection and a proportion of the field windings of the field 22 is equal to the DC voltage value Vdc in terms of a mean voltage. Hence, by referring to the DC voltage value Vdc, it becomes possible to generate the minimum number of energization points, Nmin, in consideration of the maximum output of the energization portion 14 as well.

In this instance, by preliminarily setting a torque ripple allowable value and a noise allowable value for every rotation speed R and torque command τc, it becomes possible to generate the minimum number of energization points, Nmin, in consideration of not only the torque command τc, but also the torque ripple and noises. More specifically, the torque ripple and noises are measured in advance by changing the rotation speed R, the torque command τc, and the number of energization points, N, and the minimum number of energization points, Nmin, is set on the basis of the measurement result. Alternatively, in a case where the electric motor control device 1 has a portion that directly detects the torque τ using a sensor or a portion that estimates the torque τ from a current and an electric motor constant, the torque τ can be used instead of the torque command τc.

In this embodiment, the armature windings of the armature 21 are two sets of delta-connected three-phase windings and a selection pattern of the armature windings of the armature 21 to be energized is preliminarily set so that either one of the two sets of delta-connected three-phase windings is selected or both of the two sets of delta-connected three-phase windings are selected. Hence, the minimum number of energization points, Nmin, for the armature windings of the armature 21 takes any one of values 0, 3, and 6. Also, because the field 22 has two sets of field windings, the minimum number of energization points, Nmin, takes any one of values 0, 1, and 2. The minimum number of energization points, Nmin, takes a value of 0, for example, when the torque command τc indicates 0.

A configuration of the energization signal generation portion 13 will now be described with reference to FIG. 2. As is shown in FIG. 2, the energization signal generation portion 13 is formed of an energization point selection portion 131 that outputs an energization point selection signal Ns generated on the basis of the state quantity M and the minimum number of energization points, Nmin, a current command generation portion 132 that generates a current command Ic specifying a current to be flown through the armature windings of the armature 21 and the field windings of the field 22 on the basis of the DC voltage value Vdc, the energization point selection signal Ns, and the torque command τc, a voltage command generation portion 133 that outputs a voltage command Vc from the current command Ic and the current value I, and a PWM signal generation portion 134 that outputs a PWM signal (energization signal) generated by generating a duty command by dividing the voltage command Vc by the DC voltage Vdc and comparing the duty command with a carrier (triangular wave). Of the voltage command Vc, a proportion of the armature windings of the armature 21 is an AC voltage command. Regarding the AC voltage command, a voltage command on the dq axis (d-axis voltage command and q-axis voltage command) is generated first from the current command value Ic on the dq axis (d-axis current command and q-axis current command) and the current value I on the dq axis (d-axis current and q-axis current) and then the AC voltage command is generated on the basis of the voltage command on the dq axis and the rotor position θ and outputted.

Also, of the current command Ic, a proportion of the armature windings of the armature 21 is given as a value on the dq axis in a case where a direction of the magnetic pole position of the field 22 is defined as the d axis and a direction orthogonal to the firstly mentioned direction as the q axis. In order to obtain the current value I on the dq axis from an AC current, typical three-phase to dq transformation is used. The voltage command on the dq axis and the voltage command given to the field windings of the field 22 can be generated, for example, by PI control based on a deviation between the current command Ic and the current value I. Subsequently, an AC voltage command is generated from the field position (rotation position of the field 22) and the dq voltage command and outputted. In order to generate an AC voltage command Vc given to the armature windings of the armature 21 from the field position θ and the voltage command on the dq axis, typical dq to three-phase transformation is used. In this embodiment, the electric motor 2 has the armature 21 of two sets of delta-connected three-phase windings and there are six phases. However, the principle underlying in the case of three phases can be applied to a case of six phases.

In addition, the magnitude of a voltage that can be outputted is limited by the DC voltage value Vdc. For the armature windings of the armature 21, the upper limit of the magnitude of a voltage that can be outputted is different among sinusoidal PWM, rectangular PWM, and overmodulation PWM. Herein, sinusoidal PWM is performed. In the case of sinusoidal PWM, the maximum fundamental effective value of a voltage applied to one coil in the delta-configuration connection is $1/\sqrt{2}$ times the DC voltage value Vdc. Hence, because it is necessary to give the dq voltage command within this limit, the dq voltage command is determined with reference to the DC voltage value Vdc. More specifically, the dq voltage command is determined so that a square-root of sum of squares of the d-axis voltage command and the q-axis voltage command becomes equal to or less than $1/\sqrt{2}$ times the DC voltage value Vdc. For the field windings of the field 22, the maximum value of a voltage applied to one coil is the DC voltage value Vdc. Hence, the voltage command given to the field windings of the field 22 is determined to be equal to or less than the DC voltage value Vdc.

An operation of the energization point selection means 131 will now be described in detail. Firstly, a description is given to a case where temperatures or heat values of the armature 21 and the field 22 of the electric motor 2 and the energization elements of the energization portion 14 corresponding to the respective windings of the armature 21 and the field 22 are employed as the state quantity M used in the energization point selection portion 131.

Temperatures can be found by directly measuring the temperature using, for example, a thermistor. Also, heat values can be found by estimation, for example, from resistance values and amounts of current. For every one of the armature 21, the field 22, and the respective energization elements, the temperature or the heat value can be found in any given portion. For example, a given portion can be a winding portion or a core portion for the armature 21 and the field 22 and can be a junction portion or a resin portion on the component surface for the respective energization elements. For example, it may be configured in such a manner that temperatures of the armature windings of the armature 21 and the field windings of the field 22 are measured by a thermistor and junction temperatures of the respective energization elements are measured by a temperature-measuring diode.

A description is now given to a case where an armature winding to be energized is selected among multiple armature windings of the armature 21. As has been described, the armature windings of the armature 21 are selected set by set from the two sets of delta-connected three-phase windings. In a case where the both of the two sets of delta-connected three-phase windings are selected, the operation is normal and a description is omitted herein.

One set of delta-connected three-phase winding is selected, for example, by finding an average of temperatures or heat values of the armature 21 or the energization elements corresponding to the armature windings of the armature 21 for each set of the delta-connected three-phase winding to compare the averages of the two sets and selecting whichever has the smaller average.

An upper limit value is preliminarily set for the temperatures or the heat values of the armature 21 or the energization elements corresponding to the respective armature windings of the armature 21 and the armature winding of the armature 21 having a value equal to or less than the upper limit value is selected. In consideration of allowable temperatures in the respective portions, the upper limit value is set, for example, to 100° C.

A description is now given to a case where a field winding to be energized is selected among multiple field windings of the field 22. The field winding of the field 22 can be selected, for example, by comparing temperatures or heat values of the field 22 or the energization elements corresponding to the field windings of the field 22 or differences of the temperatures or the heat values from the allowable value between the two sets, and whichever has the lower temperature or the smaller heat value or the larger margin for the allowable value is selected.

An upper limit value is preliminarily set for the temperatures and the heat values of the field 22 or the energization elements corresponding to the respective field windings of the field 22, and the field winding of the field 22 having a value equal to or less than the upper limit value is selected.

A description is now given to a case where resistance values, inductance values, reactance values, and impedance values of the armature windings of the armature 21 and the field windings of the field 22 of the electric motor 2 and the energization elements of the energization portion 14 corresponding to the respective windings are used as the state quantity M.

It is ideal that the resistance values, the inductance values, the reactance values, and the impedance values are equal among the respective windings and the respective energization elements. In actual, however, these values have variances in many cases. In a case where the electric motor 2 is controlled by setting a current flown through the respective windings according to the current command Ic as in this embodiment, a copper loss is increased and the heat value is increased as the resistance value becomes larger. Hence, in a case where a determination is made as to which one of the windings is to be selected, it is desirable to select whichever has the smaller resistance value.

In a case where a voltage applied to the windings is constant, an amount of current is increased as the resistance value, the inductance value, the reactance value, and the impedance value are smaller. Hence, the heat value is increased, too. Accordingly, in such a case, the winding having the larger resistance value, the larger inductance value, the larger reactance value, and the larger impedance value is selected.

This embodiment is configured to control a current. Hence, even when the resistance value, the inductance value, the reactance value, and the impedance value vary, a voltage to be applied is adjusted so that a current flows according to the current command. Hence, in a case where the resistance value, the inductance value, the reactance value, and the impedance value vary, the voltage does not stay constant in general. However, in a case where the electric motor 2 is in a high rotating state and the field windings of the field 22 of the electric motor 2 are energized, a voltage necessary to flow a current through the armature windings of the armature 21 is increased by an inductive voltage generated at the armature 21 and reaches the maximum output of the energization portion 14 in some cases. In such a case, the voltage to be applied to the armature windings of the armature 21 remains constant and it becomes necessary to take the consideration as above into account.

Ranges of the resistance value, the inductance value, the reactance value, and the impedance value are limited to some extent for normal windings and energization elements, and those deviating from the range are highly likely having a failure or deteriorated. Hence, proper value ranges are set for the values specified above and the winding having a value within the proper value range is selected. The proper value range can be set in consideration of temperature dependency because the respective values of the respective portions may possibly fluctuate in some degree with a temperature change. For example, a range within a nominal value ±40% can be set as the proper value range. When the temperature is measured simultaneously with the resistance value, the inductance value, the reactance value, and the impedance value in a state where a nominal value at each temperature is found in advance, influences of the temperature dependency to the respective values can be reduced and therefore the proper value range can be narrowed. For example, a range within a nominal value ±10% may be set as the proper value range.

The resistance value, the inductance value, the reactance value, and the impedance value can be found, for example, by measuring each value before the electric motor 2 is operated or can be estimated from the magnitudes or a phase relation of a voltage and a current during operation.

A description is now given to a case where an evaluation function is generated using more than one value among the temperature, the heat value, the resistance value, the inductance value, the reactance value, and the impedance value, and the energization point selection signal is generated according to the evaluation function. The relation between the respective values and the energization point selection is as has been described above. In some cases, however, it is desirable to select the energization point according to more than one value, for example, a combination of the temperature and the heat value.

For example, in a case where there is a variance in temperature among the armature windings of the armature 21 and the field windings of the field 22 of the electric motor 2 and the energization elements of the energization portion 14 corresponding to the respective windings, the temperature may be raised exceedingly when the heat values alone are compared, and the heat value may be increased exceedingly when the temperatures alone are compared. In order to eliminate this inconvenience, the energization point selection signal is generated in consideration of more than one value, such as a combination of the temperature and the heat value.

An evaluation function using the temperature and the heat value can be generated by finding a sum of the temperature and the heat value or a sum of the temperature and the heat value respectively multiplied by coefficients and using the sum thus found as a value of the evaluation function. The respective coefficients can be determined, for example, in consideration of ranges of the temperature and the heat value or in consideration as to which one of the temperature and the heat value is of more importance.

A combination is not limited to the combination of the temperature and the heat value. The evaluation function can be determined according to the idea as above by any combination of values among the temperature, the heat value, the resistance value, the inductance value, the reactance value, and the impedance value and by changing the number of values to be combined. Alternatively, a sum of differences between the respective values and the corresponding allowable values or a sum of the differences respectively multiplied by coefficients may be used as a value of the evaluation function.

As has been described above, the electric motor control device according to the first embodiment can forestall a failure occurring when the temperature or the heat value exceeds the allowable value while allowing the operation itself of the electric motor to continue by selecting an armature winding of the armature and a field winding of the field to be energized according to the temperature or the heat value.

The embodiment above has described a case where the energization signal generation portion 13 includes the energization point selection portion 131. However, instead of selecting the energization point, it may be configured in such a manner that a difference is given to currents flown through the two sets of armature windings of the armature 21 and the two sets of field windings of the field 22 according to a comparison result of the temperature, the heat value, the resistance value, the inductance value, the reactance value, and the impedance value or an evaluation result using these values. For example, a ratio of current commands may be changed according to a ratio of temperatures of the two sets of windings (the current command is lowered as the temperature becomes higher).

Also, the embodiment above has described that the energization point is selected according to the state quantity M and that a difference is given to currents flown through the two sets of armature windings of the armature 21 and the two sets of field windings of the field 22 to be energized. This processing may be performed only under a certain condition. For example, in a case where the temperature is not so high, all of the two sets of armature windings of the armature 21 and the two sets of field windings of the field 22 may be energized. Accordingly, in a case where the temperature is not so high, the original conduction pattern can be performed. Hence, there can be achieved an advantage that the electric motor 2 can exert the original performance, for example, the torque ripple can be reduced by energizing the windings of all the six phases.

The embodiment above has described a case where the electric motor 2 as a subject to be controlled by the electric motor control device 1 is a wound-field six-phase electric motor having the armature of two sets of delta-connected three-phase windings. It should be appreciated, however, that the invention is not limited to this case. The invention is also applicable, for example, to a wye-connected electric motor or an electric motor having independent armature windings, such as an electric motor represented by a switched reluctance motor. The number of phases is not limited, either, and the invention is applicable as long as two or more energization paths are secured.

The embodiment above has described a case where the energization point in the armature windings of the armature 21 of the electric motor 2 is selected set by set from the sets of delta-configuration connections. It should be appreciated, however, that the selection pattern is not limited to this case and selection can be made in units of two sets of delta-configuration connections.

The embodiment above has described that a reference is made to the field position θ of the electric motor 2. However, it may be configured in such a manner that a current is passed by generating an AC phase internally without referring to the field position θ.

The embodiment above has described that the current command Ic is generated by the current command generation portion 132. However, it may be configured in such a manner that, for example, the voltage command Vc is generated from the torque command τc and the energization signal S is generated from the torque command τc without generating the current command Ic.

The embodiment above has described that the voltage command Vc is generated by the PI control. It should be appreciated, however, that the generation method of the voltage command Vc is not limited to the method described above. The voltage command Vc may be generated by P control or I control. Also, the voltage command Vc may be generated from the current command Ic using a lookup table or the like without feeding back the current value I.

The embodiment above has described a case where control is performed using three-phase to dq transformation and dq to three-phase transformation. However, an AC may be controlled directly.

The embodiment above has described that the energization portion 14 is a voltage-fed PWM inverter. It should be appreciated, however, that a PAM inverter or a current-fed inverter may be used as the energization portion 14 as well and the energization signal may be changed to suit the energization portion 14.

The same reference numerals denote the same or equivalent portions in the respective drawings.

While the presently preferred embodiments of the present invention have been shown and described, it is to be understood that these disclosures are for the purpose of illustration and that various changes and modifications may be made without departing from the scope of the invention as set forth in the appended claims.

Various modifications and alterations of this invention will be apparent to those skilled in the art without departing from the scope and spirit of this invention, and it should be understood that this is not limited to the illustrative embodiments set forth herein.

What is claimed is:

1. An electric motor control device, comprising:
   energization elements provided correspondingly to an armature winding and a field winding of an electric motor configured so as to have an armature and or to have both of an armature and a field;
   an energization portion that energizes the armature winding and the field winding according to an energization signal given to the energization elements; and an energization signal generation portion that generates the energization signal to be outputted to the energization portion, wherein the energization signal is generated on the basis of at least one state quantity among state quantities of the armature, the field, and the energization elements and outputted, wherein the at least one state quantity includes at least one of a temperature, a heat value, a resistance value, an inductance value, a reactance value, and an impedance value of the armature, the field, and the enegization elements.

2. An electric motor control device comprising:

energization elements provided correspondinglyto an armature winding and a field winding of an electric motor configured in one of manners so as to have an armature and to have both of an armature and a field;

an energization portion that energizes the armature winding and the field winding according to an energization signal given to the energization elements; and an energization signal generation portion that generates the energization signal to be outputted to the energization portion, wherein the energization signal is generated on the basis of at least one state quantity among state quantities of the armature, the field, and the energization elements and outputted, wherein the energization signal generation portion includes an energization point selection portion that generates a energization point selection signal selecting the armature winding and the field winding to be energized according to the state quantity; and wherein the energization signal is generated according to the energization point selection signal.

3. The electric motor control device according to claim 2, wherein:

wherein the at least one state quantity includes at least one of a temperature, a heat value, a resistance value, an inductance value, a reactance value, and an impedance value; and the energization point selection portion generates the energization point selection signal by comparing at least one of the temperature and the heat value so as to select at least one energization element corresponding to the armature winding and the field winding whichever has one of the lower temperature and the smaller heat value.

4. The electric motor control device according to claim 2, wherein:

the at least one state quantity includes at least one of a temperature, a heat value, a resistance value, an inductance value, a reactance value, and an impedance value;

the energization signal generation portion includes a voltage command generation portion that generates a voltage command specifying a voltage applied to the armature winding and the field winding; and the energization signal is generated according to the voltage command.

5. The electric motor control device according to claim 4, wherein:

the energization point selection portion generates the energization point selection signal by comparing at least one of the resistance value, the inductance value, the reactance value, and the impedance value so as to select at least one energization element corresponding to the armature winding and the field winding whichever has the smaller current for the same voltage command.

6. The electric motor control device according to claim 2, wherein:

the at least one state quantity includes at least one of a temperature, a heat value, a resistance value, an inductance value, a reactance value, and an impedance value; and the energization point selection portion generates the energization point selection signal by determining an evaluation function according to at least two values among the temperature, the heat value, the resistance value, the inductance value, the reactance value, and the impedance value, so as to select at least one energization element corresponding to the armature winding and the field winding according to the evaluation function.

7. The electric motor control device according to claim 6, wherein:

the evaluation function is determined by one of at least two values among the temperature, the heat value, the resistance value, the inductance value, the reactance value, and the impedance value and a sum of differences between the values and corresponding allowable values.

8. The electric motor control device according to claim 6, wherein:

the evaluation function is determined by one of at least two values among the temperature, the heat value, the resistance value, the inductance value, the reactance value, and the impedance value and a sum of differences between the values and corresponding allowable values respectively multiplied by coefficients.

9. The electric motor control device according to claim 6, wherein:

the energization point selection portion compares the evaluation function for at least one of the armature, the field, the armature winding, the field winding, and the energization elements, and generates the energization point selection signal according to a comparison result.

10. The electric motor control device according to claim 2, wherein:

wherein the at least one state quantity includes at least one of a temperature, a heat value, a resistance value, an inductance value, a reactance value, and an impedance values; and the energization point selection portion sets an upper limit value to one of the temperature and the heat value of at least one of the armature, the field, the armature winding, the field winding, and the energization elements, and generates the energization point selection signal so as to select the armature winding and the field winding having a value equal to or less than the upper limit value with a priority.

11. The electric motor control device according to claim 2, wherein:

wherein the at least one state quantity includes at least one of a temperature, a heat value, a resistance value, an inductance value, a reactance value and an impedance value; and the energization point selection portion makes a comparison of at least one of the resistance value, the inductance value, the reactance value, and the impedance value of at least one of the armature, the field, the armature winding, the field winding, and the energization elements to determine whether the value compared falls with a proper value range, and generates the energization point selection signal so as to select the armature winding and the field winding having a value within the proper value range with a priority.

12. The electric motor control device according to claim 2, further comprising:
- a minimum energization point number generation portion that generates a minimum number of energization points indicating a minimum number of points to be energized for the armature winding and the field winding,
- wherein the energization point selection portion generates the energization point selection signal so as to select the armature winding and the field winding to be energized in a range within which the energization points are equal to or greater than the minimum number of energization points.

13. The electric motor control device according to claim 12, wherein:
- the minimum energization point number generation portion generates the minimum number of energization points according to at least one of a rotation speed, a torque, a torque ripple, and a noise of the electric motor and a maximum output of the energization portion.

14. The electric motor control device according to claim 13, further comprising:
- a torque command generation portion that generates a torque command specifying the torque to be outputted from the electric motor,
- wherein the energization signal generation portion generates the energization signal according to the torque command.

15. The electric motor control device according to claim 14, wherein:
- the minimum energization point number generation portion generates the minimum number of energization points according to the torque command.

* * * * *